US008149997B2

(12) United States Patent
Poremba

(10) Patent No.: US 8,149,997 B2
(45) Date of Patent: Apr. 3, 2012

(54) PROTOCOL CONVERTING 9-1-1 EMERGENCY MESSAGING CENTER

(75) Inventor: Todd Poremba, Seattle, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 465 days.

(21) Appl. No.: 12/453,869

(22) Filed: May 26, 2009

(65) Prior Publication Data

US 2010/0074419 A1    Mar. 25, 2010

(51) Int. Cl.
    *H04M 11/04*   (2006.01)
(52) U.S. Cl. .......................................... 379/45; 370/338
(58) Field of Classification Search .................. 379/45; 370/352
    See application file for complete search history.

(56) References Cited

U.S. PATENT DOCUMENTS

| | | | |
|---|---|---|---|
| 6,330,313 B1 | 12/2001 | Hunt | |
| 6,526,026 B1 | 2/2003 | Menon | |
| 6,795,444 B1 | 9/2004 | Vo | |
| 6,898,274 B1 | 5/2005 | Galt | |
| 2004/0176123 A1 | 9/2004 | Chin | |
| 2005/0083923 A1* | 4/2005 | Kimata et al. | 370/386 |
| 2005/0148351 A1 | 7/2005 | Reding | |
| 2005/0271051 A1 | 12/2005 | Holloway | |
| 2006/0058049 A1 | 3/2006 | McLaughlin | |
| 2007/0003024 A1* | 1/2007 | Olivier et al. | 379/45 |
| 2007/0070980 A1* | 3/2007 | Phelps et al. | 370/352 |
| 2007/0206568 A1 | 9/2007 | Silver | |
| 2007/0206613 A1 | 9/2007 | Silver | |
| 2007/0293205 A1 | 12/2007 | Henderson | |
| 2008/0081646 A1 | 4/2008 | Morin | |
| 2008/0117859 A1 | 5/2008 | Shahidi | |
| 2008/0228926 A1* | 9/2008 | Shiratzky et al. | 709/228 |
| 2008/0253535 A1 | 10/2008 | Sherry | |
| 2008/0267172 A1* | 10/2008 | Hines et al. | 370/352 |
| 2008/0273670 A1 | 11/2008 | Dickinson | |
| 2009/0094270 A1 | 4/2009 | Alirez | |
| 2009/0129396 A1* | 5/2009 | Bakker et al. | 370/400 |
| 2009/0237210 A1* | 9/2009 | Ciesla et al. | 340/10.1 |
| 2009/0284348 A1* | 11/2009 | Pfeffer | 340/7.3 |
| 2010/0003954 A1 | 1/2010 | Greene | |
| 2010/0142386 A1* | 6/2010 | Snapp et al. | 370/250 |
| 2010/0272242 A1 | 10/2010 | Croy | |
| 2011/0149953 A1 | 6/2011 | Helgeson | |

OTHER PUBLICATIONS

International Search Report in PCT/US/2010/01938 dated Sep. 30, 2010.
International Search Report issued in PCT/US2009/002752, dated Jul. 6, 2009.

* cited by examiner

*Primary Examiner* — Creighton Smith
(74) *Attorney, Agent, or Firm* — William H. Bollman

(57) ABSTRACT

Delivery of Next Generation 9-1-1 emergency services to an Internet Protocol (IP) Public Safety Answering Point (PSAP) is enabled using an existing or legacy selective router and Automatic Location Information (ALI) database. Using a protocol converting 9-1-1 messaging center according to the principles of the present invention, existing or legacy selective router equipment can provide Enhanced 9-1-1 (E911) over time division multiplex (TDM) circuits to non-IP capable PSAPs.

14 Claims, 6 Drawing Sheets

PROTOCOL CONVERTING 9-1-1 EMERGENCY MESSAGING CENTER

BACKGROUND OF THE INVENTION

1. Field of the Invention

This invention relates generally to emergency services. More particularly, it relates to an enhanced 9-1-1 systems add-on to a 9-1-1 emergency services system.

2. Background of the Related Art

Existing 911 emergency services are based on time-division multiplexed (TDM) technologies at Public Safety Answering Points (PSAPs).

FIG. 6 shows main network elements associated with a conventional 911 emergency call.

In particular, as shown in FIG. 6, a voice service provider 106 provides service to a given mobile device making a 9-1-1 emergency call. The emergency call is routed to a selective router (or any other TDM circuit based switching system) 402. The selective router routes the incoming call to a designated TDM PSAP 110 based on, e.g., a registered location of the emergency caller. The PSAP 110 determines if they are the proper PSAP, and eventually forwards the call to an appropriate emergency responder, e.g., to police responder 108.

But the need for location in a time division multiplex (TDM) based emergency call has been a long felt but unsolved need.

SUMMARY OF THE INVENTION

In accordance with the principles of the present invention, a protocol converting messaging center comprises a media gateway, and a back-to-back user agent (B2BUA) that uses Session Internet Protocol (SIP) Body rewrites to insert a current location of an emergency caller into their emergency call during call setup. A module is adapted to integrate with the B2BUA and allow the B2BUA to query various databases using both standard and proprietary protocols. In this way an emergency caller using a time division multiplex (TDM) trunk is able to access a Public Safety Answering Points (PSAP) using Internet Protocol (IP).

A method of enabling an emergency call from a TDM trunk line to access a PSAP via Internet Protocol (IP) in accordance with another aspect of the invention comprises receiving an emergency call over a TDM trunk. The emergency call is routed to a protocol converting messaging center. A current location of a caller associated with the emergency call is obtained. The current location is inserted into an Internet Protocol (IP) packet associated with call setup of the emergency call. The IP packet is routed to an IP-capable Public Safety Answering Points (PSAP).

BRIEF DESCRIPTION OF THE DRAWINGS

Features and advantages of the present invention will become apparent to those skilled in the art from the following description with reference to the drawings.

DETAILED DESCRIPTION OF ILLUSTRATIVE EMBODIMENTS

Legacy selective routers are typically designed to work with landline phones, so they don't automatically recognize cell phone numbers, and thus are not alone able to route cellular 9-1-1 calls. To solve this problem, cellular carriers created selective router-recognizable 10-digit numbers that are temporarily associated with a cell phone number. Service bureaus have provisioned these numbers into ALI databases and selective routers, so that cellular 9-1-1 calls can be routed to the correct Public Safety Answering Point (PSAP).

The present inventor has realized that existing TDM technologies cannot ideally deliver sufficiently accurate location information at the time of call set up. Moreover, while Internet Protocol (IP) networks are now available, conventional public services access points (PSAP) are not conventionally able to take advantage of the diversity, redundancy, and resiliency of Internet Protocol (IP) networks.

The present invention provides delivery of Next Generation 9-1-1 emergency services to an Internet Protocol (IP) Public Safety Answering Point (PSAP) using an existing or legacy selective router and Automatic Location Information (ALI) database. Thus, using a protocol converting 9-1-1 messaging center according to the principles of the present invention, existing or legacy selective router equipment can provide Enhanced 9-1-1 (E911) over time division multiplex (TDM) circuits to non-IP capable PSAPs.

Figure 1:
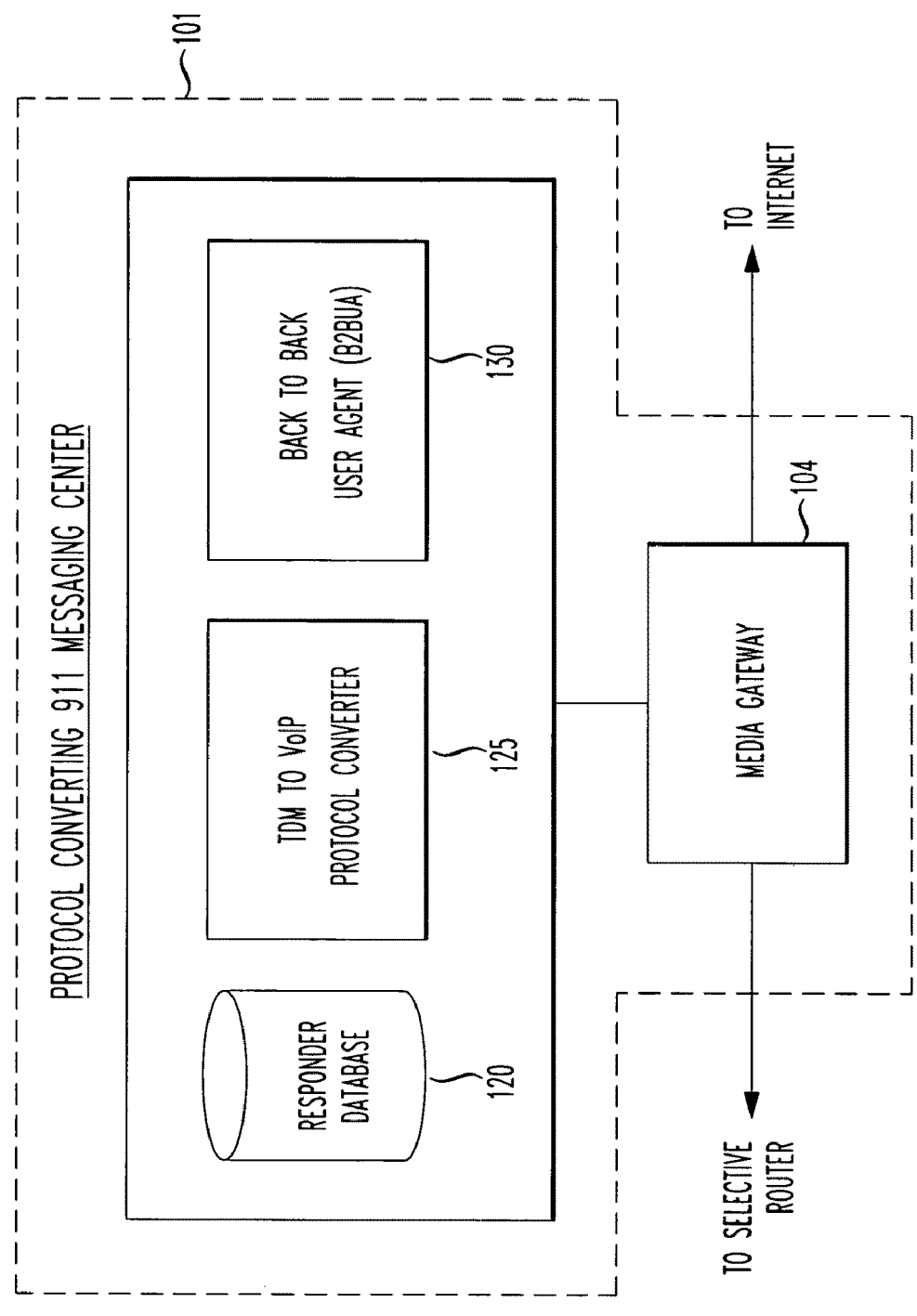
FIG. 1 shows an exemplary protocol converting 911 messaging center, in accordance with the principles of the present invention.

FIG. 1 shows an exemplary protocol converting 9-1-1 messaging center, in accordance with the principles of the present invention.

In particular, as shown in FIG. 1, an exemplary protocol converting 9-1-1 messaging center 101 includes a media gateway 104 including suitable interfaces to both a selective router (or any other TDM circuit based switching system) and the Internet (or any other IP network).

The protocol converting 9-1-1-messaging center 101 further comprises a Back-to-Back User Agent (B2BUA) 130 that allows SIP Body rewrites, a TDM-to-Voice Over Internet Protocol (VoIP) protocol converter 125, and a responder database 120, as well as application module that integrates with the B2BUA 130 and allows it to query various databases (including the responder database 120, an Automatic Identification Location (ALI) database 114 (FIG. 2), and/or a LIS 116 (FIG. 2), using both standard and proprietary protocols.

The Back-to-Back User Agent (B2BUA) 130 is a user agent to both ends of a Session Initiation Protocol (SIP) call. The B2BUA 130 resides between both end points of a phone call or communications session and divides the communication session into two call legs and mediates all SIP signaling between both ends of the call, from call establishment to termination. Each call is tracked from beginning to end. In the originating call leg, the B2BUA 130 is a user agent server (UAS) which processes the request as a user agent client (UAC) to the destination end, handling the signaling between end points back-to-back. The B2BUA 130 maintains complete state for the calls it handles. Each side of a B2BUA 130 operates as a standard SIP network element. The B2BUA 130 provides call management functions and network interworking.

The B2BUA 130 of the protocol converting 9-1-1 messaging center 101 includes a protocol converter to convert an incoming TDM emergency 911 call to Voice Over Internet Protocol (VoIP).

Figure 2:
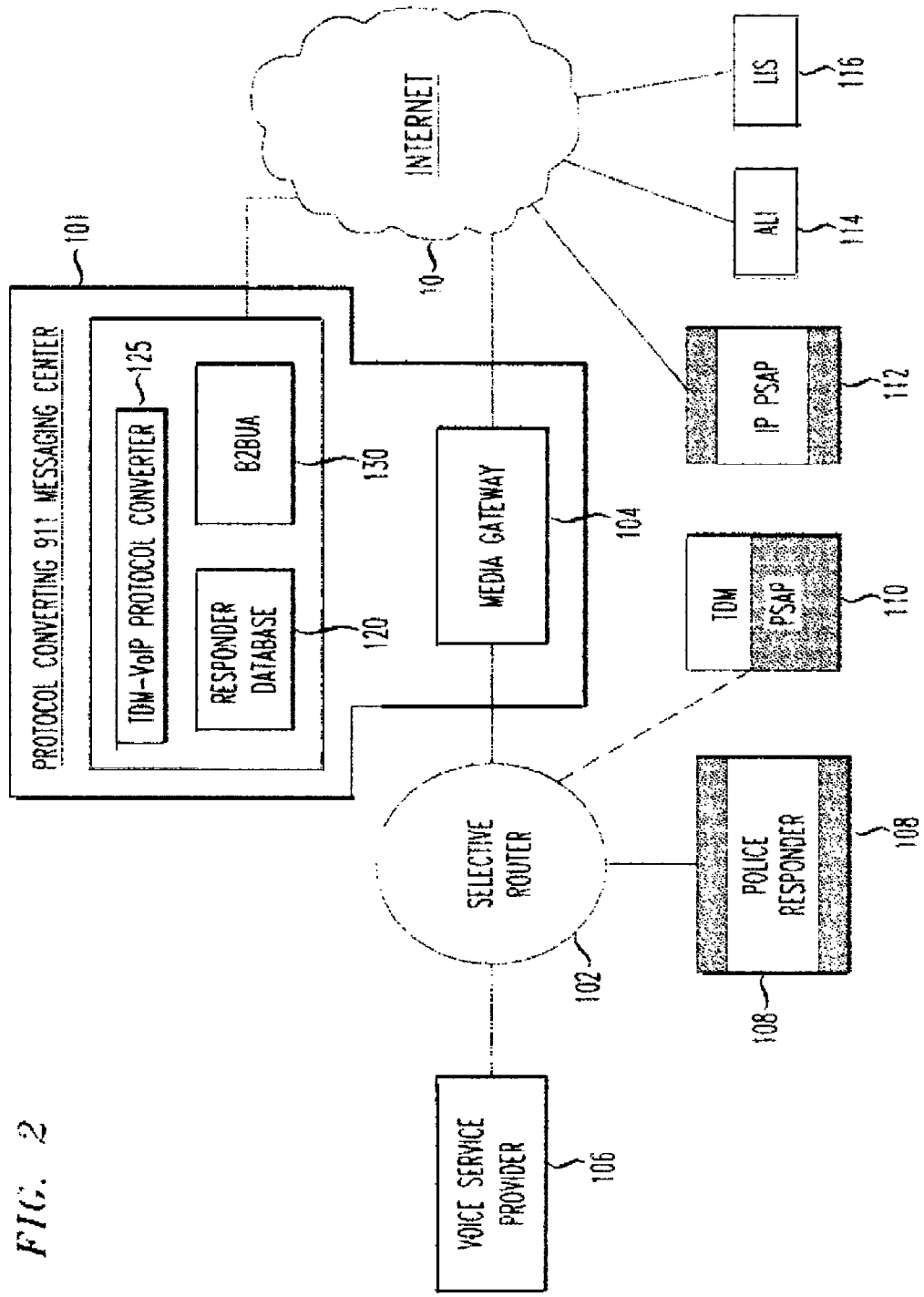
FIG. 2 shows relevant components of an exemplary 911 network associated with intercepting, converting and routing a TDM 911 call to a VoIP PSAP, in accordance with the principles of the present invention.

FIG. 2 shows relevant components of an exemplary 9-1-1 network associated with intercepting, converting and routing a TDM 9-1-1 call to a VoIP PSAP, in accordance with the principles of the present invention.

In particular, as shown in FIG. 2, the present invention provides a Next Generation protocol converting 9-1-1 messaging center 101 into an otherwise conventional legacy network (e.g., TDM phone network), and provides an interface and protocol conversion between a selective router 102 (or any other TDM circuit based switching system) having a TDM interface to the protocol converting 9-1-1 messaging center 101, and an IP interface to the Internet 10 (or any other IP network). The protocol converting 9-1-1 messaging center 101 preferably receives all relevant Time Division Multiplex (TDM) calls, and makes a routing decision for each of those calls, directing 9-1-1 calls to an appropriate IP-capable PSAP 112.

Importantly, the Next Generation protocol converting 9-1-1 messaging center 101 obtains a current location of an emergency caller, and inserts that current location information relating to a position of the caller into the SIP Invite Body of the TDM-converted-to-VoIP call in the form of Presence Information Document Format-Location Object (PIDF-LO) as recommended by NENA i3 standards. The NENA i3 standards are expressly incorporated herein by reference.

Figure 3:
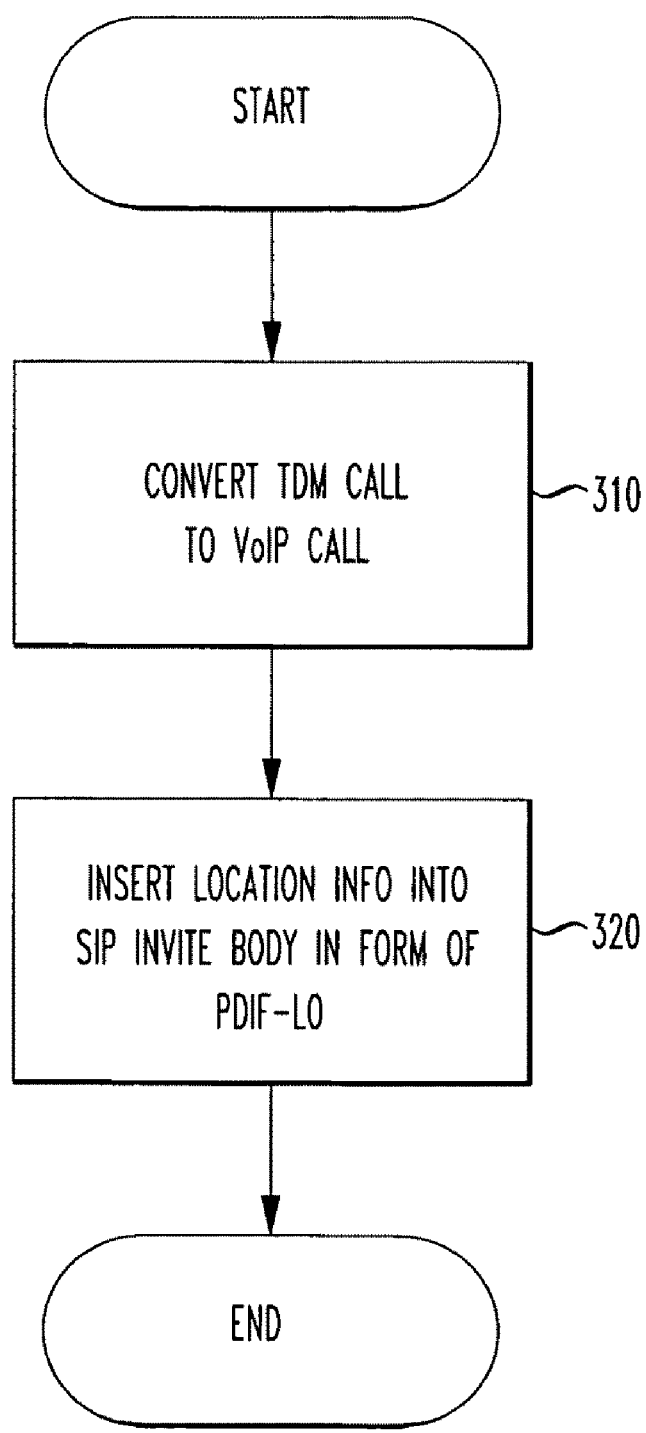
FIG. 3 shows elements of conversion of a TDM call into a voice over Internet Protocol (VoIP) call, in accordance with the principles of the present invention.

FIG. 3 shows elements of conversion of a TDM call into a voice over Internet Protocol (VoIP) call, in accordance with the principles of the present invention.

In particular, as shown in step 310 of FIG. 3, the protocol converting 9-1-1 messaging center 101 converts a TDM call into a VoIP call.

In step 320, the protocol converting 9-1-1 messaging center 101 inserts location information into the SIP Invite Body in the form of PIDF-LO.

Figure 4:
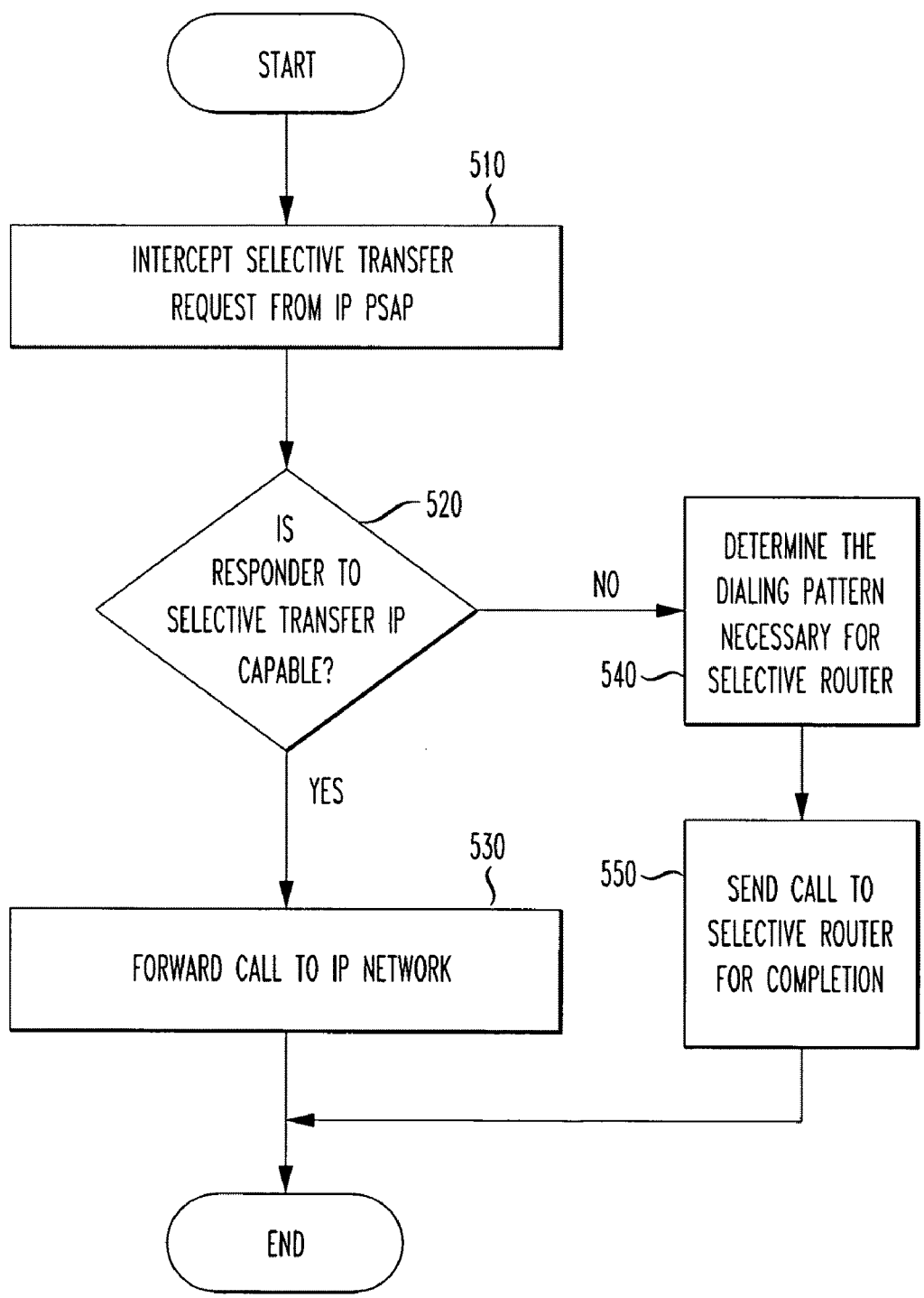
FIG. 4 shows interception of a selective transfer request from an IP PSAP, and routing of 911 call to a capable responder, in accordance with the principles of the present invention.

FIG. 4 shows interception of a selective transfer request from an IP PSAP, and routing of 911 call to a capable responder, in accordance with the principles of the present invention.

In particular, as shown in step 510 of FIG. 4, the protocol converting 9-1-1 messaging center 101 intercepts a selective transfer request from an IP PSAP.

In step 520, the protocol converting 9-1-1 messaging center 101 determines if the desired responder to the selective transfer request is IP capable.

In step 530, if the responder is IP capable, the Next Generation 9-1-1 messaging center 101 forwards the call over the IP network.

If, on the other hand, the responder is TDM capable, in step 540 the Next Generation protocol converting 9-1-1 messaging center 101 determines the dialing pattern necessary for the selective router (or any other TDM circuit based switching system) 102.

In step 550 the call is sent to the selective router (or any other TDM circuit based switching system) 102 for completion.

Figure 5:
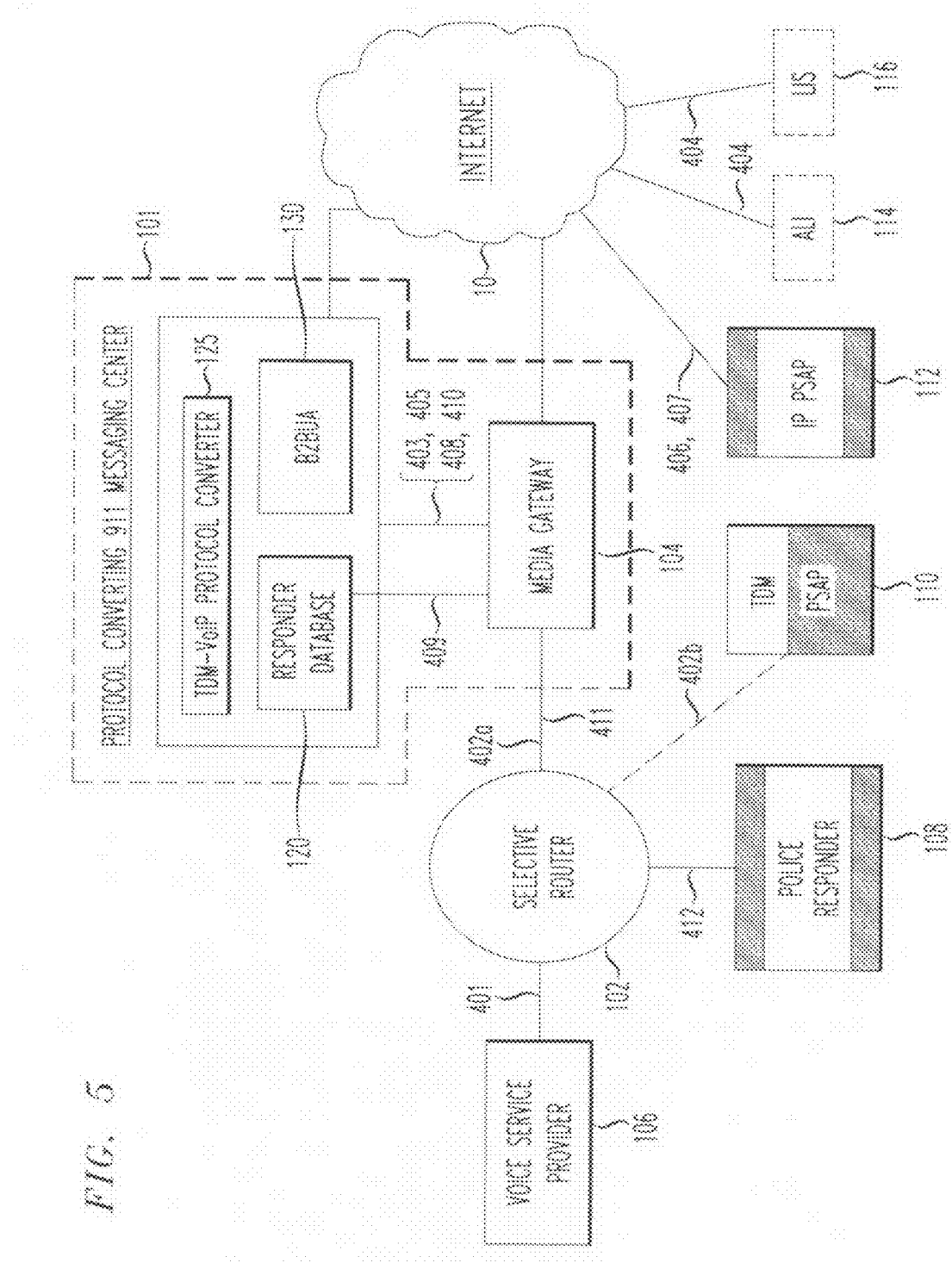
FIG. 5 shows exemplary message flow associated with the exemplary protocol converting 911 messaging center shown in FIG. 2.
Figure 6:
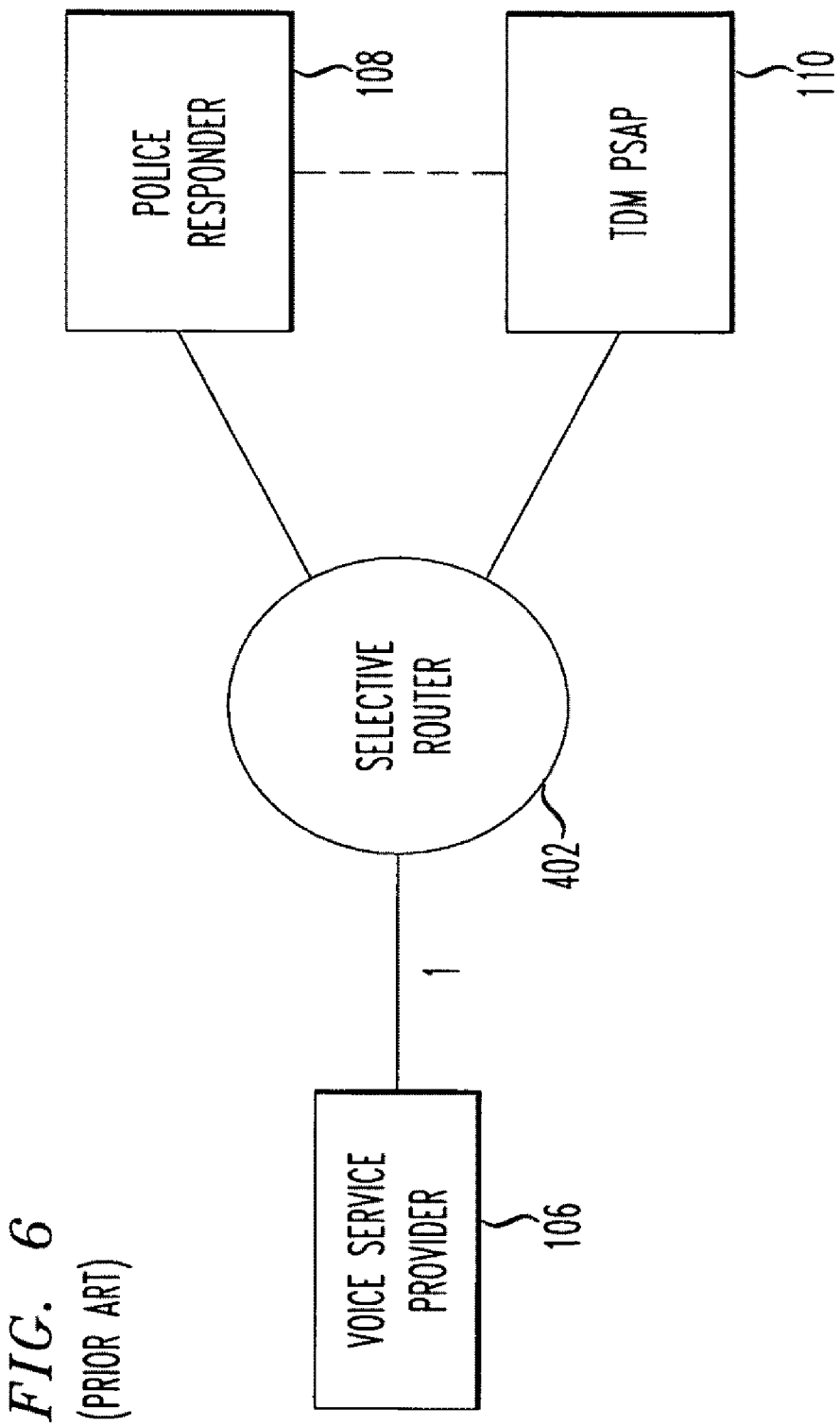
FIG. 6 shows main network elements associated with a conventional 911 call.

FIG. 5 shows exemplary message flow associated with the exemplary protocol converting 911 messaging center shown in FIG. 2.

In particular, as shown in step 401 of FIG. 5, a Voice Service Provider 106 sends a call out on 9-1-1 trunks.

The selective router 102 includes a trunk group terminating at the media gateway 104 of the protocol converting 9-1-1 messaging center 101, and another trunk group terminating at an otherwise conventional TDM-based legacy PSAP 110. In steps 402a, the call, via the selective router (or any other TDM circuit based switching system) 102, is intercepted by the protocol converting 9-1-1 messaging center 101, and is routed in step 402b by telephone number (TN) to a trunk group associated with the appropriate TDM PSAP 110.

In step 403, the media gateway 104 communicates or otherwise messages the B2BUA 130 element of the protocol converting 9-1-1 messaging center 101, though the media gateway 104 can alternatively or additionally communicate with the TDM-VoIP protocol converter 125.

In step 404, the next generation protocol converting 9-1-1 messaging center 101 queries either a location information server (LIS) 116 or an Automatic Location Information (ALI) database 114, e.g., via IP protocol over the Internet 10 (or any other IP network), (which one is optional but one must be used) using the caller's telephone number to retrieve current location information of the caller.

In step 405, the protocol converting 9-1-1 messaging center 101 sends a new message to the media gateway 104, this time including the current location information of the emergency caller by way of PIDF-LO. In this way, as shown in step 406, the IP PSAP 110 receives current location information of the caller at the time of call set up.

Thus, an incoming call goes either to the IP-capable PSAP 112 based on trunk decision made by the selective router (or any other TDM circuit based switching system) 102, or to the appropriate TDM-accessible PSAP 110 based on trunk decision made by the selective router 102.

In step 407, the PSAP 112 initiates a selective transfer using, for example, a SIP Invite to SOS.Police.

In step 408, the media gateway 104 again queries via the B2BUA 130 of the protocol converting 9-1-1 messaging center 101.

In step 409, the protocol converting 9-1-1 messaging center 101 determines who the responder is (i.e., which PSAP), and then determines how to reach that responder using information contained in an appropriate database of responders 120. The information can be obtained using either another SIP URI, or using a dialing pattern that the selective router (or any other TDM circuit based switching system) 102 can interpret, such as "*1".

In step 410, the protocol converting 9-1-1 messaging center 101 sends what it has determined to the media gateway 104.

In step 411, the media gateway 104 either sends the SIP URI to another IP node, or, as shown in FIG. 5, sends the dialing pattern to the selective router 102.

In step 412, the selective router 102 interprets the dialing pattern and sends the call out the appropriate trunk group to the proper police responder 108.

Accordingly, a Next Generation protocol converting 9-1-1 messaging center 101 as shown and described herein permits a provider to deliver additional services such as location information included in a call at the time of setup.

The invention has particular relevance to virtually any 9-1-1 emergency services provider that operates a selective router but who desires to send calls to an Internet Protocol (IP)-capable Public Safety Answering Point (PSAP).

While the invention has been described with reference to the exemplary embodiments thereof, those skilled in the art will be able to make various modifications to the described embodiments of the invention without departing from the true spirit and scope of the invention.

What is claimed is:

1. A protocol converting messaging center, comprising:
a media gateway;
a back-to-back user agent (B2BUA) that uses Session Internet Protocol (SIP) Body rewrites to insert a current location of an emergency caller device into an emergency call during call setup;
a module adapted to integrate with said B2BUA and allow said B2BUA to query various databases using both standard and proprietary protocols; and
a module to determine a protocol used to reach a proper responder to said emergency call using information contained in a responder database;
wherein said emergency caller device using a time division multiplex (TDM) trunk is able to access a Public Safety Answering Point (PSAP) using Internet Protocol (IP).

2. The protocol converting messaging center according to claim 1, further comprising:
a responder database including information regarding capabilities of a relevant PSAP intended to respond to said emergency caller device.

3. The protocol converting messaging center according to claim 1, further comprising:
a TDM-to-VoIP (Voice Over Internet Protocol) protocol conversion module to convert an emergency call incoming via a TDM trunk line to access a PSAP (Public Safety Answering Point) using Internet Protocol.

4. The protocol converting messaging center according to claim 3, further comprising:
a responder database including information regarding capabilities of a relevant agency intended to respond to said emergency caller device.

5. The protocol converting message center according to claim 1, further comprising:
a selective router to route said emergency call from a TDM trunk line to said media gateway.

6. The protocol converting message center according to claim 5, wherein:
said media gateway receives said routed emergency call over a TDM trunk line.

7. A method of enabling an emergency call from a TDM trunk line to access a PSAP via Internet Protocol (IP), comprising:
receiving an emergency call over a TDM trunk;
routing said emergency call to a protocol converting messaging center;
obtaining a current location of a caller device associated with said emergency call;
inserting said current location into an Internet Protocol (IP) packet associated with call setup of said emergency call;
routing said IP packet to an IP-capable Public Safety Answering Point (PSAP); and
determining a protocol used to reach a proper responder to said emergency call using information contained in a responder database.

8. The method of enabling an emergency call from a TDM trunk line to access a PSAP via Internet Protocol (IP) according to claim 7, wherein:
said inserting inserts said current location into a SIP Invite Body of said IP packet in the form of Presence Information Document Format-Location Object (PIDF-LO).

9. The method of enabling an emergency call from a TDM trunk line to access a PSAP via Internet Protocol (IP) according to claim 7, wherein:
said obtaining obtains said current location via query to a location information server (LIS).

10. The method of enabling an emergency call from a TDM trunk line to access a PSAP via Internet Protocol (IP) according to claim 7, wherein:
said obtaining obtains said current location via query to an automatic location information (ALI).

11. Apparatus for enabling an emergency call from a TDM trunk line to access a PSAP via Internet Protocol (IP), comprising:
means for receiving an emergency call over a TDM trunk;
means for routing said emergency call to a protocol converting messaging center;
means for obtaining a current location of a caller device associated with said emergency call;
means for inserting said current location into an Internet Protocol (IP) packet associated with call setup of said emergency call; and
means for routing said IP packet to an IP-capable Public Safety Answering Point (PSAP); and
means for determining a protocol used to reach a proper responder to said emergency call using information contained in a responder database.

12. The apparatus for enabling an emergency call from a TDM trunk line to access a PSAP via Internet Protocol (IP) according to claim 11, wherein:
said means for inserting inserts said current location into a SIP Invite Body of said IP packet in the form of Presence Information Document Format-Location Object (PIDF-LO).

13. The apparatus for enabling an emergency call from a TDM trunk line to access a PSAP via Internet Protocol (IP) according to claim 11, wherein:
said means for obtaining obtains said current location via query to a location information server (LIS).

14. The apparatus for enabling an emergency call from a TDM trunk line to access a PSAP via Internet Protocol (IP) according to claim 11, wherein:
said means for obtaining obtains said current location via query to an automatic location information (ALI).

* * * * *